(12) United States Patent
Almudafar-Depeyrot et al.

(10) Patent No.: US 10,783,872 B2
(45) Date of Patent: Sep. 22, 2020

(54) INTEGRATION OF THIRD PARTY VIRTUAL ASSISTANTS

(71) Applicant: SoundHound, Inc., Santa Clara, CA (US)

(72) Inventors: Monika Almudafar-Depeyrot, Menlo Park, CA (US); Keyvan Mohajer, Los Gatos, CA (US); Mark Stevans, Sunnyvale, CA (US)

(73) Assignee: SoundHound, Inc., Santa Clara, CA (US)

( * ) Notice: Subject to any disclaimer, the term of this patent is extended or adjusted under 35 U.S.C. 154(b) by 0 days.

(21) Appl. No.: 16/246,543

(22) Filed: Jan. 13, 2019

(65) Prior Publication Data
US 2019/0147850 A1 May 16, 2019

Related U.S. Application Data

(62) Division of application No. 15/294,234, filed on Oct. 14, 2016, now Pat. No. 10,217,453.

(51) Int. Cl.
*G10L 13/08* (2013.01)
*G10L 15/18* (2013.01)
(Continued)

(52) U.S. Cl.
CPC ............ *G10L 13/08* (2013.01); *G10L 13/043* (2013.01); *G10L 15/18* (2013.01); *G10L 15/22* (2013.01);
(Continued)

(58) Field of Classification Search
CPC ........... G10L 2015/088; G10L 15/1815; G10L 15/22; G10L 2015/223; G10L 2015/225;
(Continued)

(56) References Cited

U.S. PATENT DOCUMENTS 5,911,129 A   6/1999 Towell
6,138,100 A   10/2000 Dutton et al.
(Continued)

FOREIGN PATENT DOCUMENTS

WO   2001067241 A1   3/2001

OTHER PUBLICATIONS

Javier Gonzalez-Dominguez, et al., A Real-Time End-to-End Multilingual Speech Recognition Architecture, IEEE Journal of Selected Topics in Signal Processing, vol. 9, No. 4, Jun. 2015, pp. 749-759.
(Continued)

*Primary Examiner* — Eric Yen
(74) *Attorney, Agent, or Firm* — Dana Legal Services; Jubin Dana; John Dahnad

(57) ABSTRACT

A speech-enabled dialog system responds to a plurality of wake-up phrases. Based on which wake-up phrase is detected, the system's configuration is modified accordingly. Various configurable aspects of the system include selection and morphine of a text-to-speech voice; configuration of acoustic model, language model, vocabulary, and grammar; configuration of a graphic animation; configuration of virtual assistant personality parameters; invocation of a particular user profile; invocation of an authentication function; and configuration of an open sound. Configuration depends on a target market segment. Configuration also depends on the state of the dialog system, such as whether a previous utterance was an information query.

14 Claims, 7 Drawing Sheets

(51) Int. Cl.
  *G10L 15/22* (2006.01)
  *G10L 13/04* (2013.01)
  *G10L 15/26* (2006.01)
  *G10L 15/30* (2013.01)
  *G10L 15/08* (2006.01)
  *G10L 15/02* (2006.01)

(52) U.S. Cl.
  CPC .............. *G10L 15/26* (2013.01); *G10L 15/30* (2013.01); *G10L 2015/025* (2013.01); *G10L 2015/088* (2013.01); *G10L 2015/223* (2013.01)

(58) Field of Classification Search
  CPC . G10L 2015/228; G10L 15/26; G10L 15/265; G10L 15/28; G10L 15/30
  See application file for complete search history.

(56) References Cited

U.S. PATENT DOCUMENTS

| | | | |
|---|---|---|---|
| 6,144,938 A | 11/2000 | Surace | |
| 7,117,159 B1* | 10/2006 | Packingham | G10L 13/00 704/275 |
| 7,203,652 B1 | 4/2007 | Heck | |
| 7,565,293 B1 | 7/2009 | Fuhrmann | |
| 8,768,712 B1* | 7/2014 | Sharifi | G10L 15/08 704/275 |
| 8,924,219 B1* | 12/2014 | Bringert | G06F 3/04842 704/275 |
| 9,224,386 B1 | 12/2015 | Weber | |
| 9,368,105 B1 | 6/2016 | Freed | |
| 9,390,708 B1 | 7/2016 | Hoffmeister | |
| 9,697,202 B2 | 7/2017 | Sharma | |
| 9,728,188 B1* | 8/2017 | Rosen | G10L 15/22 |
| 9,734,845 B1 | 8/2017 | Liu | |
| 9,818,407 B1 | 11/2017 | Secker-Walker | |
| 2002/0016818 A1 | 2/2002 | Kirani | |
| 2002/0046022 A1* | 4/2002 | Rose | G10L 15/20 704/231 |
| 2002/0111803 A1 | 8/2002 | Romero | |
| 2002/0169615 A1* | 11/2002 | Kruger | G10L 15/26 704/270.1 |
| 2004/0054539 A1* | 3/2004 | Simpson | G10L 15/30 704/270.1 |
| 2004/0122668 A1 | 6/2004 | Marino | |
| 2004/0193420 A1* | 9/2004 | Kennewick | G06F 16/3329 704/257 |
| 2004/0204939 A1 | 10/2004 | Liu | |
| 2005/0187758 A1 | 8/2005 | Khasin | |
| 2005/0228668 A1* | 10/2005 | Wilson | G10L 15/193 704/256 |
| 2005/0229185 A1* | 10/2005 | Stoops | G10L 15/193 719/315 |
| 2006/0190260 A1 | 8/2006 | Iso-Siplia | |
| 2006/0253286 A1 | 11/2006 | Akabane | |
| 2007/0136072 A1* | 6/2007 | Sampath | G10L 15/30 704/275 |
| 2007/0211071 A1 | 9/2007 | Slotznick et al. | |
| 2007/0244700 A1 | 10/2007 | Kahn | |
| 2008/0046250 A1 | 2/2008 | Agapi | |
| 2008/0147406 A1 | 6/2008 | Da Palma | |
| 2009/0037179 A1 | 2/2009 | Liu et al. | |
| 2009/0144283 A1 | 6/2009 | Clark et al. | |
| 2009/0204411 A1 | 8/2009 | Morikawa et al. | |
| 2012/0016655 A1 | 1/2012 | Travieso | |
| 2013/0031476 A1 | 1/2013 | Coin | |
| 2013/0080167 A1 | 3/2013 | Mozer | |
| 2013/0080177 A1 | 3/2013 | Chen | |
| 2013/0226591 A1 | 8/2013 | Ahn | |
| 2013/0268260 A1 | 10/2013 | Lundberg | |
| 2014/0012586 A1* | 1/2014 | Rubin | G10L 25/51 704/273 |
| 2014/0095167 A1 | 4/2014 | Lynch | |
| 2014/0122079 A1 | 5/2014 | Kaszczuk | |
| 2014/0343950 A1 | 11/2014 | Simpson | |
| 2015/0019227 A1 | 1/2015 | Anandarajah | |
| 2015/0186154 A1 | 7/2015 | Brown et al. | |
| 2015/0245154 A1 | 8/2015 | Dadu | |
| 2015/0248885 A1* | 9/2015 | Koulomzin | G10L 15/08 704/251 |
| 2016/0133259 A1* | 5/2016 | Rubin | G10L 15/22 704/238 |
| 2016/0155443 A1* | 6/2016 | Khan | G06F 1/3203 704/275 |
| 2016/0163332 A1 | 6/2016 | Un et al. | |
| 2016/0189706 A1 | 6/2016 | Zopf | |
| 2016/0232899 A1 | 8/2016 | Chen | |
| 2016/0253997 A1* | 9/2016 | Kerr | G10L 15/22 381/110 |
| 2016/0336006 A1 | 11/2016 | Levit et al. | |
| 2016/0372110 A1 | 12/2016 | Waltermann | |
| 2017/0083285 A1* | 3/2017 | Meyers | G10L 15/1815 |
| 2017/0242657 A1 | 8/2017 | Jarvis | |

OTHER PUBLICATIONS

Guy Alon, Key-Word Spotting—The Base Technology for Speech Analytics, NSC—Natural Speech Communication Ltd. white paper, Jul. 2005, pp. 1-8.
TrulyHandsFree: Always-On Speech Recognition From Sensory, Apr. 10, 2013, pp. 1-6, Berkeley Design Technology, Inc.
Jordan Cohen, Voice Morphing—A Simple View Talking with a Different Head, AVIOS Mobile Voice Conference 2014, Mar. 4, 2014, Speech Morphing, Inc.
Gene Ball and Jack Breese, Emotion and Personality in a Conversational Character, Workshop on Embodied Conversational Characters, Oct. 12-15, 1998.

* cited by examiner

INTEGRATION OF THIRD PARTY VIRTUAL ASSISTANTS

This application claims priority to U.S. non-provisional patent application Ser. No. 15/294,234, titled VIRTUAL ASSISTANT CONFIGURED BY SELECTION OF WAKE-UP PHRASE, and filed on Oct. 14, 2016.

FIELD OF THE INVENTION

The present invention is in the field of automatic speech recognition, and in particular virtual assistants.

BACKGROUND

Phrase Spotting

Automatic speech recognition (ASR) systems exist that recognize human speech in many languages, such as English, Mandarin Chinese, and Spanish. Recognizing speech in each individual language requires a large amount of computational resources, including memory, CPU, real time, and power consumption.

Some systems, for example, perform ASR on telephone communications. This is particularly true where law enforcement agencies must monitor phone calls in order to collect intelligence for national security and other purposes. These large-vocabulary ASR systems require a level of processing power that is impractical for continuous listening in power-sensitive devices such as mobile phones.

Automated recognition of a small set of short (one to several words) phrases requires far fewer computational resources. Many virtual assistant systems perform continuous recognition that targets some particular wake-up phrase. This process is known as phrase spotting. Even if power consumption is not an issue, phrase spotting is required to prevent a virtual assistant from behaving intrusively by responding to utterances not intended for it. Various commercial implementations detect the phrases, "Hey, Siri", "OK, Google", and "Alexa". Various chip and software vendors, such as Sensory, provide devices and algorithms optimized for phrase spotting. Common algorithms in the field use a neural network to detect wake-up phrases embedded in the ambient sound continuously captured from microphones.

When a system recognizes a wake-up phrase, it switches to a more computationally-intensive mode, recognizing a much larger vocabulary to process more sophisticated utterances. That function processes speech until it detects an end-of-utterance condition, at which point it reverts to the low-power phrase-spotting state, typically after a short refractory period.

FIG. 1 illustrates a state diagram for a speech-enabled virtual assistant operating on a mobile phone. The virtual assistant initially runs a phrase spotter. If it detects a wake-up phrase and the phone has a network connection to a remote ASR server, it begins sending captured audio to the server to perform ASR using a full language vocabulary. The process continues until the server detects an end of utterance (such as a long time period with little sound), at which time the server performs an appropriate responsive action, and signals the mobile phone app to return to its phrase spotting state.

Some devices buffer the audio of an utterance until it detects an end of the utterance, and only then performs ASR on the utterance. Some devices buffer audio in a network endpoint device. Some devices buffer audio in a server.

Virtual Assistant Language Selection

Some ASR systems recognize speech in two or more languages. This is useful for automatic translation among multiple speakers, for assistants that can respond to queries from multiple speakers of different languages, or in some cases for bilingual speakers who most naturally express different concepts in different languages.

Multilingual ASR systems may be implemented in different ways. One approach employs a joint recognizer that essentially combines the vocabularies and natural language grammars of multiple languages. However, with more than a few languages, such a vocabulary is too large, and speech recognition accuracy decreases. Efficiency also drops if partially completed utterances have additional candidate parses.

Therefore, what is needed is a system and method that is able to parse utterances from several vocabularies, though just one at a time. This improves recognition accuracy without creating inefficiency. To select the appropriate vocabulary for any given utterance, the phrase spotter listens for multiple wake-up phrases. One wake-up phrase causes the system to parse the full utterance in a first language vocabulary, another wake-up phrase causes the system to parse the full utterance in a second language, etc. For example, a virtual assistant could respond to "OK, Hound" by performing an English language parse of the full utterance, and the assistant could respond to "Anyong, Hound" by performing a Korean language parse of the full utterance ("Anyong" being the Romanized transliteration of the Korean word meaning "Hello"). Such an assistant system determines the desired input language based on a small vocabulary of known wake-up phrases, and processes the subsequent utterance accordingly.

SUMMARY OF THE INVENTION

Aspects of the present invention are directed to systems for, and methods of, configuring the behavior of a virtual assistant in response to distinct wake-up phrases. Accordingly, embodiments of the invention spot a plurality of wake-up phrases.

Beyond using different wake-up phrases to invoke speech recognition using different language vocabularies, embodiments of the invention support wake-up phrase selection to vary many other features or components of a virtual assistant, as well as attributes of such components. Various embodiments configure one or more of: their text-to-speech (TTS) system, such as by speech morphing; the vocabulary that they recognize; the vocabulary that they use for responses; their ASR acoustic model; a graphic animation; parameters controlling the personality of a virtual character; the use of a particular user profile; and authentication functionalities. Various embodiments further perform configuration based on: a voice characteristic; the immediate state of a dialog system; and the location of the speaker.

BRIEF DESCRIPTION OF THE DRAWINGS

The specification disclosed includes the drawings or figures, wherein like numbers in the figures represent like numbers in the description and the figures are represented as follows.

DETAILED DESCRIPTION

The terms configure, configuring, and configuration, as used in this specification and claims, may relate to the assigning of values to parameters, and also may relate to defining the presence or absence of objects. Though this specification offers examples to illustrate various aspects of the invention, many systems and methods that are significantly different from the examples are possible with the invention.

Figure 1:
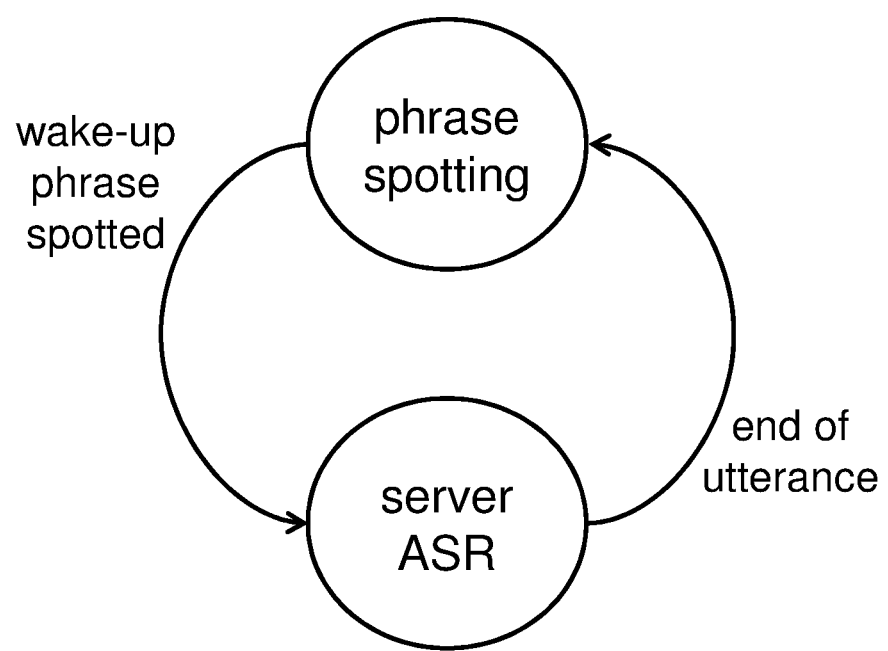
FIG. 1 illustrates a state diagram for a system with phrase spotting backed by an ASR server.
Figure 2:
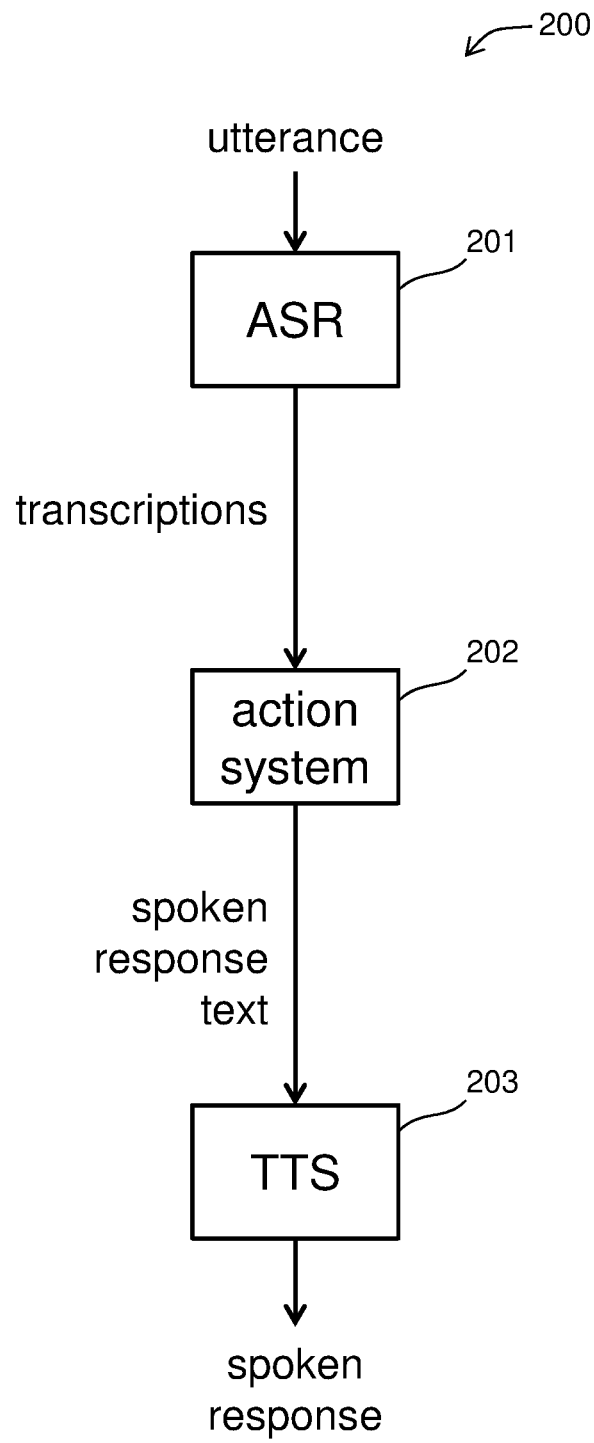
FIG. 2 illustrates the main components and information flow of a conversational virtual assistant system according to an embodiment of the present invention.

As shown in FIG. 2, a speech-enabled virtual assistant 200 comprises at least an ASR system 201, a system for performing appropriate actions 202, and a text-to-speech (TTS) system 203 for providing spoken responses to users. ASR system 201 takes in the speech audio of an utterance and generates one or more sets of text that hypothetically are what the speaker said. Some such systems also output a score for each hypothesis, indicating its likelihood of being correct.

Action system 202 accepts one or more transcriptions, interprets them, determines which one is most likely the user's intent, and performs whatever action, within its repertoire, is most likely to satisfy the user's intent. Answering questions is an example of one kind of action. Performing a command is an example of another kind of action. Sending a text message is an example of an action resulting from a command. Some embodiments have a default action to perform when no other action seems more likely to have been desired. One such default action is to perform a web search using the text of the ASR text of the most likely interpretation. Some embodiments provide a text string to be spoken as a response to the user for each request utterance. Some embodiments provide a spoken response only when no other action is deemed appropriate.

TTS system 203 accepts spoken response text and outputs audio for a spoken response. In some embodiments the TTS system is in a network endpoint device, such as a mobile phone or automobile, which receives spoken text from a cloud server. In some embodiments the TTS system is within a cloud server, which sends spoken response audio to network endpoint devices.

Figure 3:
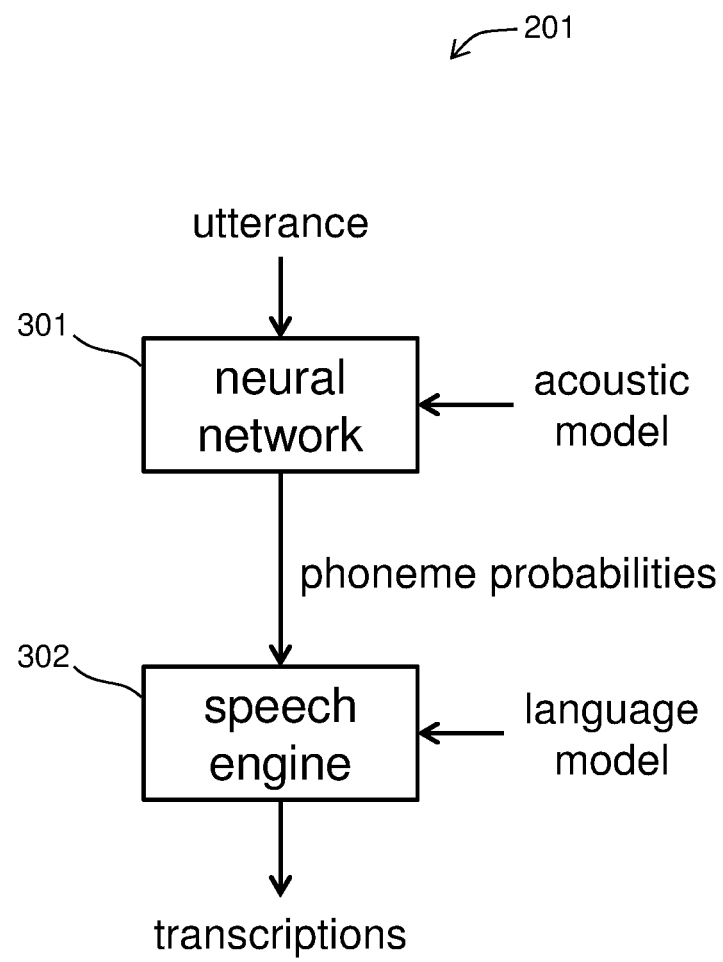
FIG. 3 illustrates the components and information flow of an automatic speech recognition system according to an embodiment of the present invention.

As shown in FIG. 3, ASR system 201 comprises a neural network 301. It receives and processes the audio of user utterances using some acoustic model to produce a set of one or more phonemes and associated probabilities. ASR system 201 also comprises analysis speech engine 302. It compares the recent phoneme probabilities to n-grams from a language model to formulate one or more transcriptions.

Figure 4:
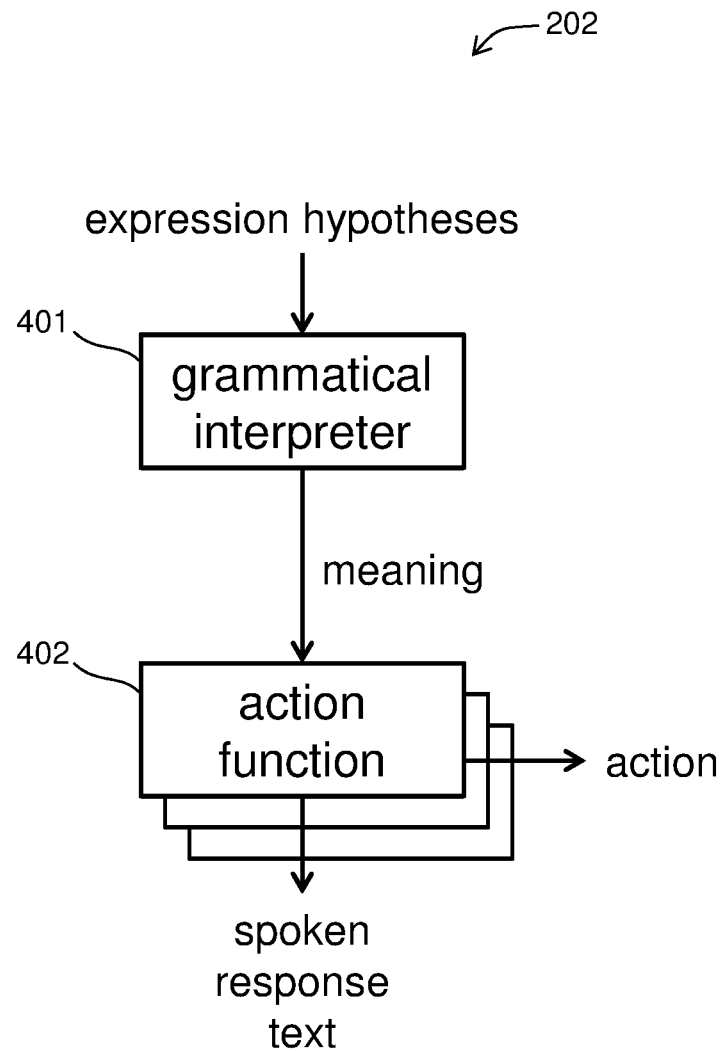
FIG. 4 illustrates the components and information flow of an action system according to an embodiment of the present invention.

As shown in FIG. 4, action system 202 comprises a grammatical interpreter 401. It uses the transcriptions to produce a representation of the meaning of the expression. A set of action functions 402 use the meaning to perform an action, if the expression requests an action, the action is feasible, and the user has permission to invoke the action. One such common action is a request for information, such as an article from Wikipedia, information about a scheduled appointment, or directions to a particular location. Some other examples of actions are the creation of an appointment on a calendar, sending of a message, launching of an app, and placing an online purchase order. Action functions 402 respond to user requests (a) by (optionally) performing a requested action; and (b) by producing text embodying an appropriate spoken response.

Figure 5:
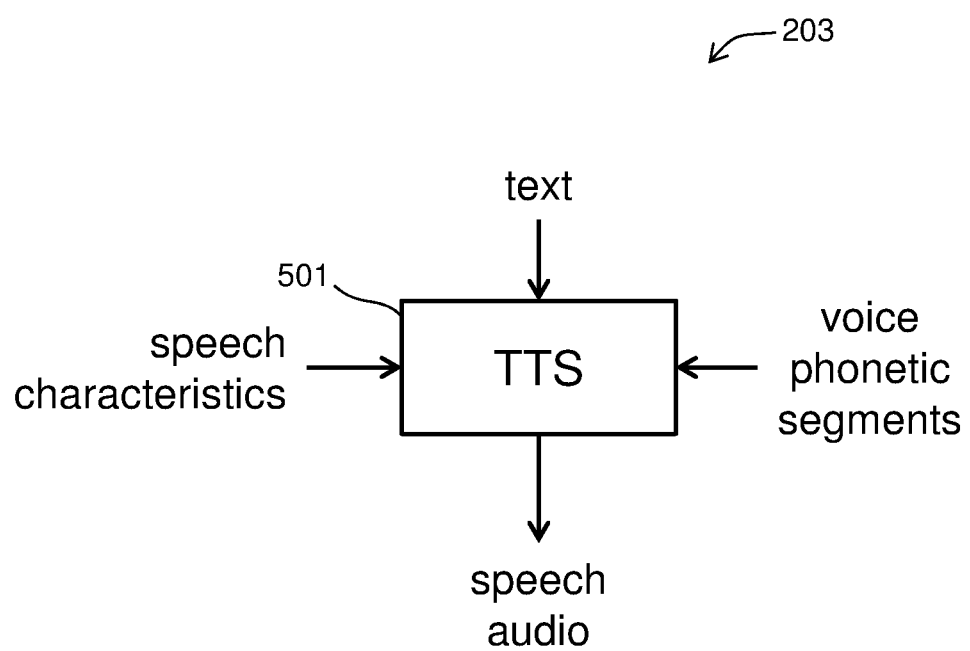
FIG. 5 illustrates the information flow of a text-to-speech system according to an embodiment of the present invention.

As shown in FIG. 5, TTS system 203 comprises TTS function 501. It receives text to be spoken to the user, which is used to process phonetic segments from a voice donor. This process may also be influenced by speech prosody data, such as local intonation or stress markup in the given text, or global prosody parameters assigned to the specific voice. The TTS function 501 outputs speech audio.

Some systems, according to the invention, are configurable in each of the ways shown in FIG. 2 to FIG. 5. By changing the configuration based on the wake-up phrase detected, it is possible to cause a virtual assistant to behave in very different ways, which can have many potential applications. One use is the selection of a particular spoken language. For example, the phrase "Hi, Robot" causes the ASR system to perform recognition with an English language model and grammar, and "Salut, Robot" causes the ASR system to perform recognition with a French language model and grammar.

Another use is to give users the impression that the dialog system actually comprises multiple virtual assistants. This is especially true if the different wake-up phrases have different human-sounding multisyllabic names, and the per-phrase configuration includes distinctive TTS voices. For example, one particular system according to the invention responds to three different wake-up phrases. "Hey, Lisa" invokes an English language model with a typical American vocabulary, the personality as expected of a polite American secretary, knowledge of the weather, user calendar, contact list, facts from Wikipedia, and a female TTS voice. The wake-up phrase "Bonjour, Jean-Jacques" invokes a combined French and English language model, a charmingly brusque personality as might be expected of an engaging French-English bilingual chef, knowledge of recipes and "blue humor" in both languages, and TTS voices in both French and French-accented English. The wake-up phrase "Good day, Edward" invokes an English language model with an extensive vocabulary, a personality as expected of a television news reporter, a knowledge of news, and a male TTS voice morphed to match the attributes of a 1950s era American evening news reporter.

Plugins

Some embodiments of the invention comprise a server-based speech-enabled dialog system with ASR, natural-language understanding, knowledge-domain and action functions, and TTS functions, wherein the system allows developers to create plugins. Some plugins act as unique, complete virtual assistants. Some act as modifiers of pre-existing assistants. Some act as add-ons that expand the functionality of a pre-existing assistant. An example of a modifier-type plugin is one that changes the voice of an existing assistant. An example of add-on plugin is a bank teller assistant that handles your bank operations, in addition to any other functionality users might expect from your virtual assistant. Each plugin has a unique wake-up phrase. Some providers of dialog systems provide certain plugins, but also allow third parties to develop plugins.

Various devices may connect to such a server-based system over networks such as the Internet. Some such devices are speech-enabled kitchen toasters, self-driving automobiles, mobile phones running apps, and public kiosks. The developers of such devices may develop assistant plugins specific to their devices, such as ones that perform device-specific functions such as making toast to a desired darkness, driving to a desired location, answering factual questions, and fulfilling purchase orders.

Device makers choose which plugins, available on the server, are accessible on their devices. Device makers may also use plugins from third parties. In some cases, device makers contract with third parties for assistant plugins that make the device more valuable. In some cases, third party assistant plugin developers contract with device makers to promote the products and services that their assistants offer. In some cases, device vendors, plugin developers, or both contract with the system provider for the service of hosting plugins and responding to user requests through the provider's servers. In some embodiments, device users are enabled to choose which plugins are available on the device through means such as a virtual store. In some such embodiments, users pay for access to virtual assistant plugins.

Some plugins use the names, voices, and small talk phrases of celebrities. Some embodiments have a system host that responds to the phrase, "Is <Celebrity Name> there?" with an indication as to whether the indicated celebrity plugin is installed and enabled. Some celebrity plugins are for historical figures, and provide educational knowledge domains such as one of Abraham Lincoln that teaches about the US Civil War. Some plugins are celebrities in their own right, through clever design and promotion by system vendors, not because they are representations of living singers, actors, politicians, or others traditional celebrities. Some plugins are invoked by non-literal utterances, such as one representing a cow for children, invoked by a wake-up phrase including "moo! moo!".

Plugins each have one or more wake-up phrases that are unique among all plugins available on a given device. Plugins each have certain useful pre-programmed behaviors. In some systems developers must, in some systems they may not, and in some systems they are allowed to program plugins at a low level. Some system providers offer SDKs and parameterized libraries to provide simple interfaces for programmers to define virtual assistants. Some such interfaces optionally accept parameters for: acoustic model selection; acoustic model adaptation parameters; language model; definition of an expression parsing grammar; lists of legal requests and corresponding responses; code describing action functions including access to web APIs; choice of a TTS voice (phonetic segment set); TTS voice morphing parameters; personality parameters; and one or more wake-up phrases.

The following is a definition of a virtual assistant plugin using a language of a particular embodiment of the invention.

```
plugin butler {
    amodel = system.amodBritishAccentWithNoise;
    lmodel = system.langStandardEnglish;
    grammar = {system.domWeather, system.domNews,
```

-continued

```
    system.domCalendar};
    voice = system.ttsJeeves;
    formality = 0.9;
    arousal = 0.1;
    speed = 0.9 * system.TTSSpeed;
    wakephrases = {"OK, Jeeves", "OK, Butler"}
}
```

The keyword plugin declares an assistant plugin. It is named "butler". Information within the braces configures parameters of the plugin, with reference to system objects, parameter values from 0 to 1, system global variables, and text strings. This assistant uses a language model trained for British accent speakers in noisy environments. It uses a standard English language model. It interprets expressions according to a set of natural language grammars for domains of discourse related to weather, news, and a user calendar. It uses a TTS voice named Jeeves, donated by a mature adult with a British accent. The assistant should behave with a high level of formality (0.9), low level of arousal (0.1), a speed that is set to 10% lower than the system global parameter TTSspeed. This virtual assistant responds to either of the wake phrases "OK, Jeeves" and "OK, Butler". The parameters formality and arousal are available to programmers of natural language grammars. A natural language grammar may be programmed to respond to queries of "How <temperature word> is it?", where temperatures word is ["hot", "cold", "warm", "cool"], with:

```
if(formality > 0.3)
    "The current temperature is <temperature data> degrees, Celsius.";
else
    "bout <temperature data> or so.";
```

Systems, according to the various aspects of the invention, that allow third-party developers to create assistant plugins may allow users to download and install, and disable and enable assistant plugins. Some assistant plugins have mature-themed content such as the Seven Dirty Words and other profanity in its grammar. Those are provided only to verified adult users, and restricted by parental control on the virtual assistant system.

Television and movie producers can create assistant plugins with natural language grammars and personalities of their characters. Data providers with web APIs, such as the US Patent and Trademark Office (USPTO), can create plugins that promote their own data offerings and make them available to speech-enabled assistants. Some assistant plugins provide games or other entertaining behavior and also provide responses that promote the products and services of advertisers. Some assistant plugins access user-specific personal information, such as electronic health records for giving automated medical advice for common conditions. Some assistant plugins are educational, designed to help children with homework or teach course material of massively open online courses. Some assistant plugins provide proactive information without waiting for queries, such as in-car navigation assistance. Some system vendors curate stores with free and for-a-fee assistant plugins that users can browse and download.

Some embodiments of the invention provide aids for developers to create custom assistants. In some embodiments, those are specialized languages with great flexibility to create natural language grammars, such as Terrier from SoundHound. Other embodiments provide for programming assistants using standard languages such as JavaScript, and provide underlying library functions.

Conditional Access

Some embodiments allow providers to control the enablement of plugins based on location. For example, a plugin with the personality of a famous cartoon character becomes enabled only in the vicinity of a theme park. Enablement is a result of a function call by a user device to a location service that uses GPS or other equivalent satellite constellation navigation beacons for geolocation, mobile phone basestation triangulation, or Bluetooth indoor location beacons.

Some embodiments allow providers to control the enablement or configuration of plugins based on time of day, day of week, or time of year. For example, a plugin for children's entertainment is available only outside of normal hours for school and sleep. In another example, a plugin changes its small talk behavior between weekends and weekdays. In another example, a particular Santa Claus plugin becomes available only between Thanksgiving and Christmas day.

Commands

Some embodiments include dedicated wake-up phrases for device control commands, such as "turn off phone". Some embodiments allow users to set wake-up phrases that invoke particular actions, such as "call home" to dial a particular user-configured phone number. Some embodiments include dedicated wake-up phrases for emergency functions, such as "call 9-1-1".

TTS

One of the strongest factors of a virtual assistant's apparent personality is the voice that it uses to speak responses to users. A common way to produce TTS voices is to record a large number of samples of speech by a specific person, known as a donor. For an assistant plugin for the USPTO, it might be logical to use the voice of Director Michelle K. Lee. For an assistant plugin for The Simpsons™ it might be logical to use the voice of Nancy Cartwright, the voice actor who plays the cartoon character, Bart Simpson, as long as the copyright holder would agree to license the rights.

For organizations or developers without the means to produce high quality TTS voices, it is preferable to use an existing voice. However, if more than a few developers use the same voice, users might falsely infer the personality of one plugin when using another. One solution is to allow configurable speech morphing where configuration is done by assignment of values to parameters. Typical implementations of speech morphing work by changing the fundamental frequency and spectral characteristics of TTS voice recordings.

Figure 6:
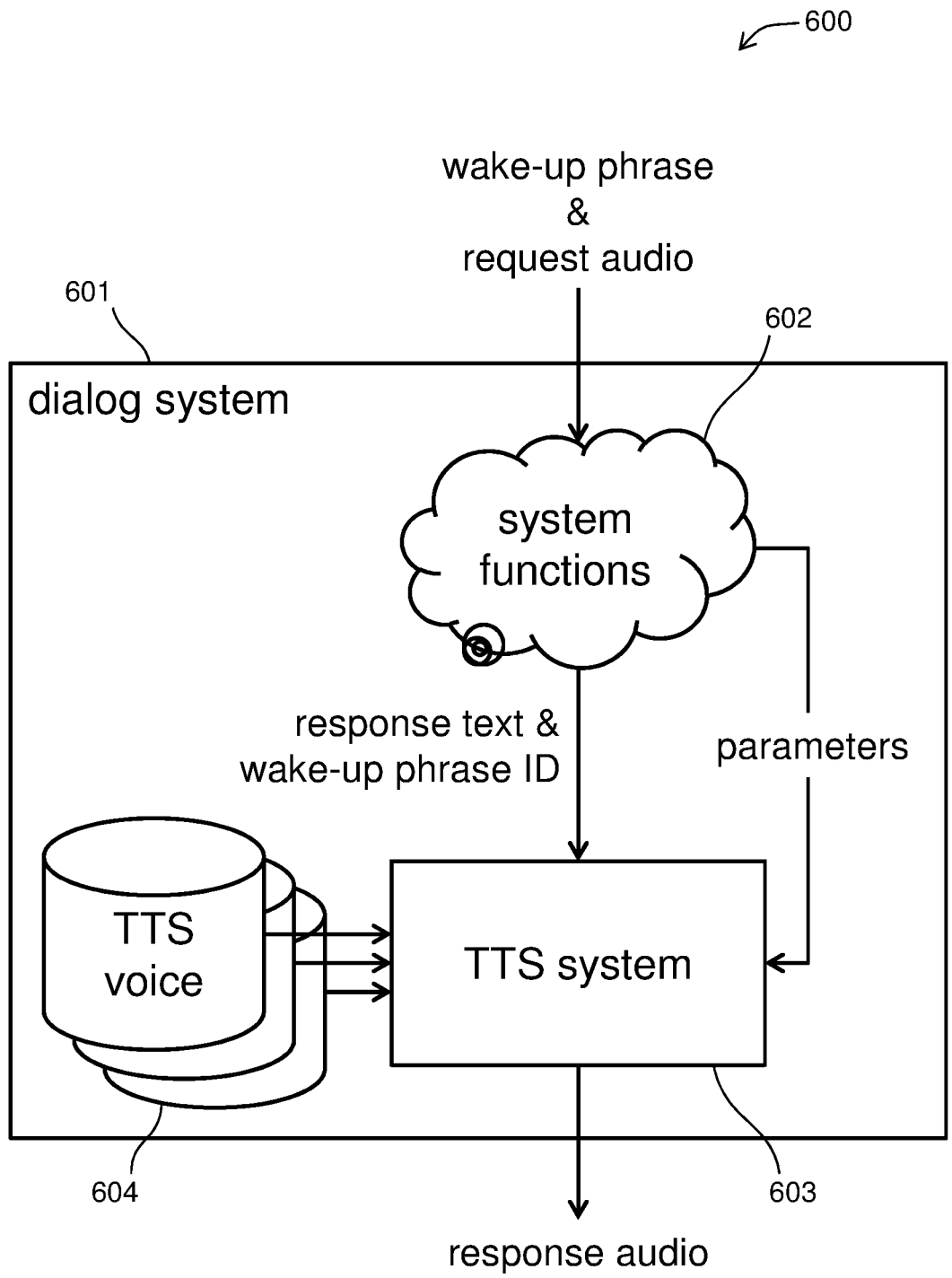
FIG. 6 illustrates a dialog system comprising a TTS system that selects between TTS voices based on a wake-up phrase.

Various embodiments of the invention allow configuration (selection of voice and morphing parameters) of TTS in response to particular wake-up phrases. FIG. 6 shows one such embodiment 600, which, upon detecting any one of a plurality of wake-up phrase, receives audible requests. Dialog system 601 receives wake-up phrase and request audio and produces response audio. It comprises various system functions 602 that takes in the wake-up phrase and request audio. The system functions 602 configure parameters related to TTS, which is on a per-request basis, and produces response text and a signal indicating the ID of the wake-up phrase. TTS system 603 receives the response text and wake-up phrase. Based on the wake-up phrase, it chooses one of a plurality of TTS voices 604. The TTS system 603 applies the parameters from the system functions 602, to produce the output response audio.

Figure 7:
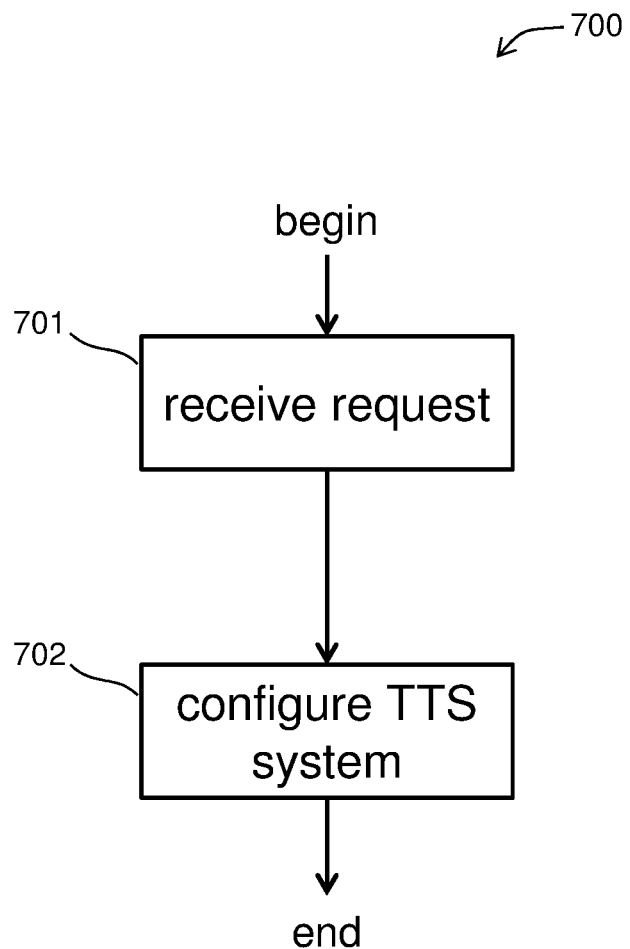
FIG. 7 illustrates a process of configuring the TTS system.

FIG. 7 shows a method of configuring a dialog system. The method begins with receiving a request at step 701. The request includes an indication of which of a plurality of wake-up phrase has been detected. The method proceeds to step 702, in which the system configures a TTS system in a way that is in response to receiving the request. The configuration is based on which of the plurality of wake-up phrases was detected.

Vocabulary

A language model with a very large vocabulary is prone to incorrect transcription, particularly for short and uncommon expressions. Speech recognition can be made significantly more accurate by reducing the scope of the language models. By invoking only a domain-specific language model in response to a particular wake-up phrase, speech recognition results can be superior.

Another aspect of some embodiments of the invention is the ability for virtual assistant developers to configure a specific language model for a specific wake-up phrase. For example, a pharmacy virtual assistant with the wake-up phrase, "Hi, Phyllis", enabled to answer questions about medications, would have the chemical, generic, and brand names of each of thousands of medications. A user who asks, "Hi, Phyllis. Is it dangerous to take sodium thiopental and pancuronium bromide together?" would get a response, "Yes." with a strong emphasis speech characteristic. A general English language model would omit most such drug names.

Virtual assistants, invoked by different wake-up phrases, according to the invention may also use different vocabulary in responses. It would be appropriate to use simple words for responses by a virtual assistant for children, while a virtual assistant for the USPTO would use very precise vocabulary.

ASR Acoustic Model

Neural networks are a common algorithm for speech recognition. Neural networks for speech recognition must be trained on samples of speech incorporating known words. Speech recognition works best when the training speech is recorded with the same speaker accent and the same background noise as the speech to be recognized. Some ASR system acoustic models are trained with speech over car noise. A navigation personal assistant with the wake-up phrase, "Hey, Nancy." would appropriately select an acoustic model trained with background car noise.

A virtual assistant with specific knowledge regarding Latino culture with the wake-up phrase, "Hola, Luis." would appropriately choose an acoustic model trained with a large portion of Hispanic accented speakers.

Graphic Animations

Some systems, according to the invention, include both audio speaker output and video displays. In some embodiments, the video display shows text and graphics, with font choice, style, size, and colors specific to a wake-up phrase. Some embodiments include a 3D graphic animated character with a mouth that moves in coordination with the TTS speech output. Different wake-up phrases may invoke a plugin that causes the character on the video display to change appearance. In some embodiments, a character remains on the display until the system detects a wake-up phrase of another character. At that time, the first character walks away and the character of the wake-up phrase enters the display while the user completes an utterance. At the end of the utterance, the character moves its mouth in coordination with the TTS output.

Some systems with a visual display, according to the invention, provide users with an indication of when the system is phrase spotting and when the system is performing full ASR. This provides some users a sense of privacy when the system indicates that it is only phrase-spotting. Various embodiments indicate phrase spotting and ASR modes by using: a green light and red light; an icon of an ear and an icon of a mouth; an animation of a fidgeting character with blinking eyes and an animation of the character with eyes wide open such as Microsoft Clippy. In the latter case, the system indicates a response mode by the animated character's mouth moving in synchrony with the response TTS audio.

For virtual assistant developers who do not have the resources to program 3D graphic animations, some virtual assistant system providers provide configurable avatars. As developers can configure speech morphing, developers can also configure avatar attributes, such as gender, hairstyle, and clothing to create unique personal assistant characters.

Personality Parameters

Many virtual assistants may use the same kinds and sources of data. For example, a butler, personal assistant, and news reporter may all offer responses with weather data. Developers of such distinct personal assistants may use common domain grammars. However, some embodiments provide configurable common domain grammars. Such domain grammars recognize parameters for one or more of: arousal, intensity, verbosity, formality, color, optimism, and vocabulary. Generated responses are conditional based on such parameters. For example, a user question, "How old is Hillary Clinton" may be correctly answered by any of, "68", "She's 68.", "68 years old", and "Hillary Rodham Clinton is 68 years, 9 months, and 27 days old, today.". The domain of people knowledge, according to some embodiments, is programmed to give each answer format under different combinations of domain grammar parameters within a set. The parameter values are defined as part of the virtual assistant definition. In some embodiments, such parameters are dynamic, beyond constant values in virtual assistant definitions.

Many assistants provide responses, known as "small talk," to utterances that are neither a request for domain-specific information nor a command. For example, in response to the utterance, "Hello." one virtual assistant is programmed to reply, "Well, hello there." but another virtual assistant is programmed to reply, "Yo, wha's up." The set of small talk utterances and responses varies by wake-up phrase, according to some embodiments of the invention.

User Profiles

In some embodiments wake-up phrases are specific to particular users. Though multiple assistant personalities have the same capabilities, each user tends to relate to the virtual assistant system using their own wake-up phrase. This gives the impression of each user having their own personal assistant. In such embodiments, the system maintains personal knowledge and state specific to its associated user, such as the user's calendar and contact list. For example, user Alice can say, "Hey, Andy. What's my next appointment." to get information from her personal calendar. One moment later, Bob can say, "Ok, Betty. Text my mother happy birthday." to send a text to his mother. Bob can also say, "Ok, Andy. What's Alice's next appointment" to ask Alice's assistant for Alice's schedule.

In some embodiments, each user of a shared system registers an account, with a unique email address or telephone number, through an interface device. During registration, each user chooses a unique name and gender for their personal assistant. The system chooses a unique, gender-appropriate, TTS voice and set of morphing parameters for each user. The system also configures its phrase spotter for each assistant's wake-up phrases. In some embodiments, only names from a pre-determined set are allowed, the set being ones with a pre-trained phrase spotter models. In some embodiments, the system asks the user to say, "Hey, <name>" three times, and uses those recordings to train the phrase spotter.

Each user's assistant authenticates access to an appropriate database of user information. Some examples of such databases are a Google profile, Facebook profile, Apple profile, and Amazon profile. Various user-specific databases include calendar appointment times, contact list, emails, history of postings, and demographic information such as age, gender, race, marital status, education level, and political orientation. By invoking their unique personal virtual assistant names, users are able to ask questions, such as about upcoming appointments, give commands, such as sending messages, and receive offers and advertisements specific to themselves.

Authentication Function

In some embodiments of the invention in which multiple users share a device, it is important to control access to information. For example, Alice can also say, "Hey, Andy. Keep my schedule confidential." In that case, the system will perform voice speaker identification or image face recognition, and the Andy assistant will only respond to calendar queries if it recognizes Alice. Some embodiments use multiple wake-up phrases to allow different information access permissions for a single user's information.

In some embodiments, whenever any user says, "Hey, Andy." the system causes a function on Alice's phone or other personal device to wake up, capture audio, and send its information to the system. The system causes the assistant to emit a tone or melody. If Alice's personal device captures the tone, the system has then authenticated that Alice's device is in the same space as the assistant's speaker. This ensures authentication even if Alice loses her voice to laryngitis or Bob gets good at emulating Alice's voice.

Open Sound

Even some cloud server based embodiments of the invention configure not only system features on servers, but system features on local network endpoint devices, such as phones, tablets, or other internet connected things. One local configurable element is the open sound that devices emit after detecting a wake-up phrase to indicate to users that the device is listening, and act as an audio prompt. According to some embodiments, the open sound is specific to each wake-up phrase. Similarly, some embodiments configure the close sound that devices emit after detecting an end of utterance.

Distinct open sounds are useful for users who have multiple voice-enabled devices. Users of multiple devices sometimes become confused and use the wake-up phrase for the wrong one. In human-to-human communication, when a speaker says the wrong name, listeners can identify the mistake and inform the speaker. Devices cannot. In some embodiments, multiple devices have the same back-end virtual assistant ASR and natural language processing system. As long as such devices have unique apparent personalities and open sound, when users accidentally address the wrong device, its unique open sound provides a mental cue that might remind the user of the mistake. Some embodiments allow users, to cancel accidental requests to unintended virtual assistants. Some embodiments do so by recognizing the phrases "cancel" and "never mind" at the beginning of an utterance. Unique open sounds are comparable to unique ringtones that users can customize based on the personality of the caller.

According to some embodiments, a server stores a plurality of open sounds, and transmits a chosen one to the voice-enabled device before beginning to capture a user utterance. This allows the server to change open sounds dynamically as virtual assistant providers wish. According to some embodiments, a voice-enabled device stores a plurality of open sounds as audio data. Audio can be represented any various formats, such as compressed in an MP3 format or raw in a WAV file. A processor, either one that does phrase spotting or another one, runs program code that, when one of a plurality of a wake-up phrase is detected, detects which one it was. Accordingly, the program causes the processor to select one or another of the open sounds to emit.

Dialog System State

According to some embodiments, certain wake-up phrases are recognized only under certain conditions. This is supported either by the phrase spotter detecting, but ignoring wake-up phrases that are unavailable, or by configuring the phrase spotter according to which wake-up phrases are supported. The former is simpler, but the latter is better for power savings, especially if the number of possible wake-up phrases is large. According to some embodiments, different wake-up phrases enable different sets of assistants, one of which is selected by the first word or phrase immediately following the wake-up phrase. For example, "Hi, Princess" is a wake-up phrase that enables a number of princess assistants but not any pharmacist or chef assistants. The immediately following phrase selects which, such that "Hi, Princess Aurora" would invoke a sleeping beauty and "Hi, Princess Leia" would invoke an agent of the Rebel Alliance.

In one embodiment, certain wake-up phrases respond to commands that control operation of a local device, but other phrases cause interactions with a remote server. If a network connection to the server is unavailable, such as because the device is in a car driving through a deep, dark tunnel, the phrase spotter ignores server-directed wake-up phrases. In some embodiments, the user device responds with a pre-canned phase "There is no connection," in response to a server-directed wake-up phrase, when no network connection is available. After network connectivity is restored, the phrase spotter re-enables server-directed wake-up phrases.

Some embodiments have wake-up phrases that cause local server-independent actions, such as "Help, Police" invokes a 9-1-1 emergency call, records all following audio until a user enters a PIN, and performs local ASR with a small, highly reliable, grammar specialized for emergency situations.

Some speech-enabled systems provide localized access to information. This is true, for example, in order sell the same product with different pricing in different countries. Some systems support both high-end and low-end products. Software development and testing is simplest if both products have the same system capabilities. However, enabling certain functions, invoked by specific wake-up phrases in high-end products, and disabling those functions' wake-up phrases in low-end products allows for maximizing revenue by selling to both ends of the market with different pricing. Various embodiments control access to wake-up phrases by setting jumpers, setting DIP switches, blowing fuses, or programming firmware accordingly.

Some embodiments of the invention support a first wake-up phrase for initiating a user query, and a second wake-up phrase such as, "Tell me more." The second wake-up phrase elicits a more verbose response to the previous query or following additional information. Doing so requires conversation state history for the assistant system to know the subject for follow-up. For example, a query response that provides the first sentence of a Wikipedia article might provide the entire first paragraph in response to "Tell me more." However, at the beginning of a session, the second wake-up phrase, "Tell me more.", is disabled. Furthermore, after an utterance that the system interprets as a command, rather than a query, the second wake-up phrase becomes disabled. The system enables the second wake-up phrase only after utterances that it interprets as a query for information. Various embodiments implement the second wake-up phrases in the phrase spotter, in the full language model, or in both the phrase spotter and the full language model.

Server Systems

Some embodiments of the invention are cloud-based systems. They are implemented with, and controlled by, a server processor, FPGA, custom ASIC, or other processing device. Such systems also comprise one or more digital storage media such as a hard disk drive, flash drive, solid-state storage device, CD-ROM, floppy disk, or box of punch cards. The storage media store one or more of the TTS voice data and voice morphing parameters; one or more language model; one or more ASR acoustic models; one or more natural language grammars; one or more animation motion descriptions; one or more sets of personality parameters; one or more sets of user profile data; and program instructions. Some embodiments access such information and data from remote or third party sources. Cloud-based embodiments have network interfaces that interact with network endpoint devices such as mobile phones, automobiles, kiosk terminals, and other voice-enabled devices. Network endpoint devices spot for wake-up phrases and provide indications to the cloud-based system of which wake-up phrase was detected. In some embodiments, the indication is an ID number. In some embodiments, the indication is a text string. In some embodiments, the indication is a sequence of audio samples. Some embodiments, the receive indications encapsulated in an object description in a language such as JSON or XML.

Embodiments of the invention described herein are merely exemplary, and should not be construed as limiting of the scope or spirit of the invention as it could be appreciated by those of ordinary skill in the art. The disclosed invention is effectively made or used in any embodiment that comprises any novel aspect described herein. All statements herein reciting principles, aspects, and embodiments of the invention are intended to encompass both structural and functional equivalents thereof. It is intended that such equivalents include both currently known equivalents and equivalents developed in the future.

The behavior of either or a combination of humans and machines (instructions that, if executed by one or more computers, would cause the one or more computers to perform methods according to the invention described and claimed and one or more non-transitory computer readable media arranged to store such instructions) embody methods described and claimed herein. Each of more than one non-transitory computer readable medium needed to practice the invention described and claimed herein alone embodies the invention.

Some embodiments of physical machines described and claimed herein are programmable in numerous variables, combinations of which provide essentially an infinite variety of operating behaviors. Some embodiments of hardware description language representations described and claimed herein are configured by software tools that provide numerous parameters, combinations of which provide for essentially an infinite variety of physical machine embodiments of the invention described and claimed. Methods of using such software tools to configure hardware description language representations embody the invention described and claimed. Physical machines, such as semiconductor chips; hardware description language representations of the logical or functional behavior of machines according to the invention described and claimed; and one or more non-transitory computer readable media arranged to store such hardware description language representations all can embody machines described and claimed herein.

In accordance with the teachings of the invention, a computer and a computing device are articles of manufacture. Other examples of an article of manufacture include: an electronic component residing on a mother board, a server, a mainframe computer, or other special purpose computer each having one or more processors (e.g., a Central Processing Unit, a Graphical Processing Unit, or a microprocessor) that is configured to execute a computer readable program code (e.g., an algorithm, hardware, firmware, and/or software) to receive data, transmit data, store data, or perform methods.

The article of manufacture (e.g., computer or computing device) includes a non-transitory computer readable medium or storage that may include a series of instructions, such as computer readable program steps or code encoded therein. In certain aspects of the invention, the non-transitory computer readable medium includes one or more data repositories. Thus, in certain embodiments that are in accordance with any aspect of the invention, computer readable program code (or code) is encoded in a non-transitory computer readable medium of the computing device. The processor or a module, in turn, executes the computer readable program code to create or amend an existing computer-aided design using a tool. The term "module" as used herein may refer to one or more circuits, components, registers, processors, software subroutines, or any combination thereof. In other aspects of the embodiments, the creation or amendment of the computer-aided design is implemented as a web-based software application in which portions of the data related to the computer-aided design or the tool or the computer readable program code are received or transmitted to a computing device of a host.

An article of manufacture or system, in accordance with various aspects of the invention, is implemented in a variety of ways: with one or more distinct processors or microprocessors, volatile and/or non-volatile memory and peripherals or peripheral controllers; with an integrated microcontroller, which has a processor, local volatile and non-volatile memory, peripherals and input/output pins; discrete logic which implements a fixed version of the article of manufacture or system; and programmable logic which implements a version of the article of manufacture or system which can be reprogrammed either through a local or remote interface. Such logic could implement a control system either in logic or via a set of commands executed by a processor.

Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

The scope of the present invention, therefore, is not intended to be limited to the exemplary embodiments shown and described herein. Rather, the scope and spirit of present invention is embodied by the appended claims.

What is claimed is:

1. A method of providing access to a third party virtual assistant, the method comprising:
   receiving, from a device, speech audio and an indication of which of a plurality of wake-up phrases the device detected;
   sending, in response to the indication that indicates a particular wake-up phrase, the speech audio to the third party virtual assistant, wherein the third party virtual assistant provides a third party knowledge domain; and
   receiving a response from the third party virtual assistant.

2. The method of claim 1 wherein the response is voice audio including a distinctive voice, the method further comprising sending the voice audio to the device.

3. The method of claim 1 wherein the response is text, the method further comprising:
   synthesizing voice audio corresponding to the text using a text-to-speech voice corresponding to the indication indicating the particular wake-up phrase; and
   sending the voice audio to the device.

4. A method of providing access to a virtual assistant, the method comprising:
   receiving, from a device, speech audio and an indication of which of a plurality of wake-up phrases the device detected;
   sending, in response to the indication indicating a particular wake-up phrase, the speech audio to the virtual assistant, wherein the virtual assistant provides at least one knowledge domain; and
   performing automatic speech recognition on the speech audio to recognize text.

5. The method of claim 4 further comprising receiving a response from the virtual assistant wherein the response is voice audio having a distinctive voice, the method further comprising sending the voice audio to the device.

6. The method of claim 5 wherein the device is shared and the distinctive voice is gender-appropriate for a registration choice by a user.

7. The method of claim 4 further comprising:
receiving a text response from the virtual assistant;
synthesizing voice audio corresponding to the text response using a text-to-speech voice corresponding to the indication indicating the particular wake-up phrase; and
sending the voice audio to the device.

8. The method of claim 7 further comprising:
receiving a 3D graphic animation having a mouth; and
coordinating movement of the mouth with the synthesized voice audio; and
sending the animation to the device.

9. The method of claim 7, wherein the synthesizing of the voice audio comprises performing speech morphing by assigning values to parameters that affect fundamental frequency and spectral characteristics.

10. The method of claim 7 wherein the device is shared and the text-to-speech voice is gender-appropriate for a registration choice by a user.

11. The method of claim 4 further comprising:
causing a function on a second device to capture sound;
emitting a tone;
receiving, by the second device, the emitted tone; and
authenticating the second device in response to the second device receiving the emitted tone.

12. The method of claim 4, wherein the particular wake-up phrase is recognized only under a certain condition.

13. The method of claim 4 further comprising:
receiving location information; and
enabling a plugin based on the location information.

14. The method of claim 4 further comprising enabling a plugin based on a time of day.

* * * * *